March 25, 1958     H. KURZ     2,828,253
PROCESS OF DIGESTING FIBROUS PLANT MATERIAL
Filed Nov. 4, 1954
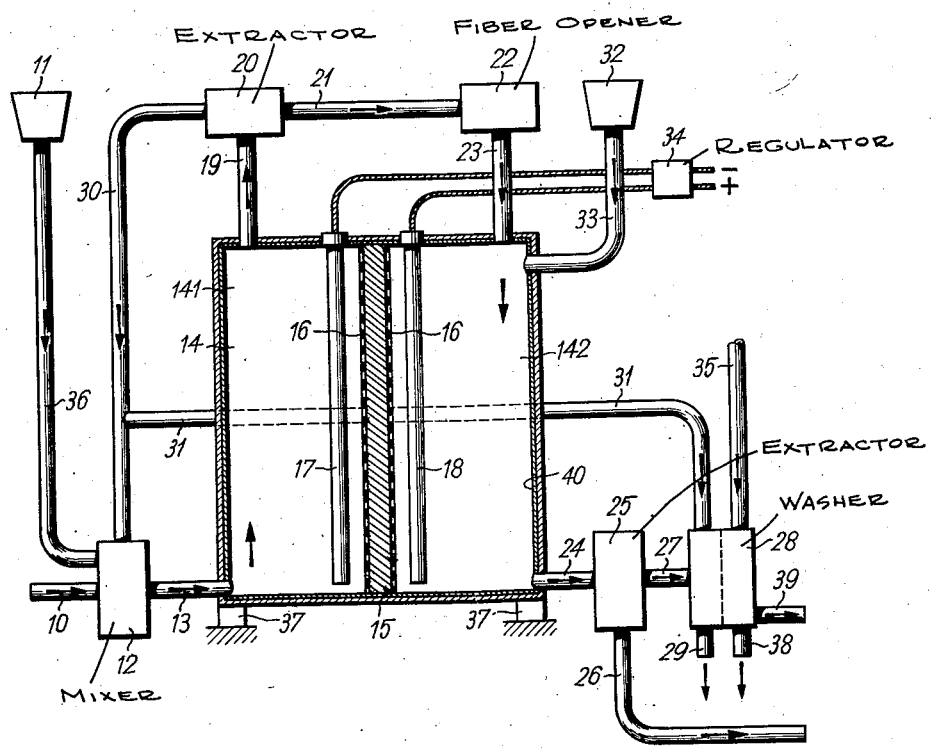
Inventor:
Hans Kurz
By:
Michael S. Striker
agt.

United States Patent Office 2,828,253
Patented Mar. 25, 1958

2,828,253

PROCESS OF DIGESTING FIBROUS PLANT MATERIAL

Hans Kurz, Stuttgart-Riedenberg, Germany

Application November 4, 1954, Serial No. 466,897

Claims priority, application Great Britain November 13, 1951

7 Claims. (Cl. 204—132)

The present invention relates to a process of digesting fibrous plant material such as wood, straw and the like, and more particularly to a continuous process of digesting such fibrous plants by means of alkaline lye and chlorine.

The present application is a continuation-in-part of my copending application Serial No. 320,020, filed November 12, 1952, for "Process and Apparatus for Digesting Wood, Straw, or Other Fibrous Plants," now abandoned.

Many processes have been developed for the digestion of fibrous plants which attempt to simplify the production of cellulose as compared to the so-called classical processes, i. e. calcium sulfite or sodium sulfate digestion processes, and to provide for more economical and more simplified production of cellulose from fibrous plants.

One of the better known of such processes is the continuous process of caustic soda-chlorine, or "soda-chlorine" process, which is mainly employed for the digestion of annual crops such as cereal straw, bagasse, rice straw, and sugar cane.

All of the known processes, however, have disadvantages, not so much as regards the quality of the final product, but mainly in connection with the economics of the process in view of the large consumption of chemicals and energy, the long reaction time, the difficulty of disposing of the effluent, and the difficulty of achieving a reliable control of the process and of obtaining a homogeneous final product.

It is, therefore, a primary object of the present invention to provide a new method of digesting cellulose-containing materials such as wood, straw or other fibrous plants which avoids all of the aforementioned disadvantages and limitations of the known processes without deleteriously affecting their inherent advantages.

It is another object of the present invention to provide a method of digesting fibrous plants by the production of the reactive agents at the point of need thereof, e. g. in contact with or within the material to be treated.

It is still another object of the present invention to provide an easily controllable process of digesting fibrous plants which results in the production of a uniform product at all times.

It is a further object of the present invention to provide a more econimical method of digesting wood, straw or the like.

It is still a further object of the present invention to provide a process of digesting fibrous plants wherein the properties of the final product may be readily controlled and wherein the process can either be carried out in stages or continuously.

It is yet another object of the present invention to provide a process of digesting wood, straw and the like which process can be carried out utilizing only cheap and readily available chemical reagents.

Other objects and advantages of the present invention will be apparent from a further reading of the specification and of the appended claims.

With the above objects in view, the present invention mainly consists in a process of digesting cellulose-containing raw material such as wood, straw, or other fibrous plants, comprising the steps of subjecting a cellulose-containing material, preferably in subdivided state, to treatment with alkaline lye molecules and to treatment with halogen molecules, at least one of the treatments being carried out by electrolysis of a salt solution adapted to form upon electrolysis the molecules to which the cellulose-containing material is to be subjected during such treatment, the salt solution being during electrolysis in contact with the cellulose-containing material, whereby the treatment is accomplished by the formed molecules in statu nascendi thereof.

Preferably both the alkaline lye and the halogen treatment are carried out by the electrolysis of the salt solution which produces the respective molecules of either the alkaline lye or the halogen upon electrolysis so that both of the treatments are by molecules in statu nascendi.

The term "alkaline lye" as used throughout the specification and claims is meant to denote alkali metal hydroxides, alkaline earth metal hydroxides and ammonium hydroxide. Any salt which upon electrolysis of the solution thereof will form any of the above hydroxides so that the same are available upon electrolysis in statu nascendi is suitable for the purposes of the present invention. However for purposes of better understanding, the present invention will be discussed mainly with reference to caustic soda (NaOH) since this is the most suitable and the most economical.

Similarly, any salt which upon electrolysis of a solution thereof will form a halogen so that the halogen is available in statu nascendi during the electrolysis of the salt solution, is suitable for the halogen treatment according to the present invention. Although other halogens such as bromine may be used, the halogen treatment of the present invention is most preferably carried out with chlorine so that the process of the present invention will be mainly discussed with reference to chlorine treatment.

It is possible according to the present invention to either utilize a single salt which upon electrolysis produces both the alkaline lye and the halogen for the electrolyte solution for both the cathode and anode treatments, e. g. NaCl which upon electrolysis in solution produces NaOH at the cathode and chlorine at the anode, or different salts one of which produces the alkaline lye at the cathode and the other of which produces the chlorine at the anode. Thus natural sea water is an excellent basic liquid for making the electrolyte solutions for the purposes of the present invention.

During actual practice the cathode is separated from the anode by means of a membrane which solely permits passage of the ions but which does not permit passage of the electrolytes and the cellulose-containing material so that the treatment is in two separate compartments, a cathode compartment in which the caustic soda treatment takes place and an anode compartment in which the chlorine treatment takes place. It is possible to simultaneously treat two separate batches, one of which is in the cathode compartment and is subjected to caustic soda treatment and the other of which is in the anode compartment and is subjected to chlorine treatment, both treatments being by the respective molecules in statu nascendi.

As indicated, common salt, namely sodium chloride, is the most preferred salt for the purposes of the present invention for both the cathode and anode electrolyte solutions. This substance not only produces both caustic soda and chlorine upon electrolysis so that the same substance may be used for both treatments, but it also is extremely cheap and readily available. However, the sodium chloride may either be replaced in part or wholly in either of the compartments or other substances may be added to the solution in either of the compartments in order to chemically affect the properties of the final product as desired. Such substances include, alkaline earth chlorides, alkali metal sulfates, alkali metal sulfites, alkaline earth sulfates, alkaline earth sulfites, etc. Among the suitable salts for the production of alkaline lye in statu nascendi upon electrolysis of solutions thereof are: $NH_4Cl$, $NaCl$, $KCl$, $MgCl_2$, $CaCl_2$, $BaCl_2$, $NH_4Br$, $NaBr$, $KBr$, $MgBr_2$, $CaBr_2$, $BaBr_2$, $MgCO_3$, $CaCO_3$ and $BaCO_3$.

The process of the present invention may be carried out continuously by having the stock continuously travelling through the processing plant from cathode chamber to anode chamber with separations of the solution medium and washing in between if desired. The plant may consist of a single cathode and single anode chamber or a plurality of such chambers, the stock alternately passing through the chambers until the treatment thereof is completed.

The treatment of the cellulose-containing raw material by the caustic soda and/or chlorine in statu nascendi is highly advantageous, the effect of these agents being considerably higher and above all more uniform than that obtainable with a process wherein these agents are supplied from the outside.

Since the electrolysis may be readily controlled by comparatively simple and well known means, the quantity of the caustic soda and/or of the chlorine per unit of time may be controlled as desired within a very wide range, whereby damage to the fibers of the stock is prevented.

The electrolysis of the salt solution in contact with the cellulose-containing material according to the present invention in order to produce the caustic soda and/or chlorine in statu nascendi results in the achievement of the following:

On the one hand consumption of chemical compounds is reduced to a minimum in view of the exact control of the proper amounts or reagents and on the other hand the heat produced by electrolysis may be utilized for achieving and maintaining the proper reaction temperature which must be generated in the process known in the art by supplying the respective amount of heat from the outside, e. g., by means of steam.

The process according to the invention may be carried out at a temperature above normal, but preferably at atmospheric pressure and at temperatures below 100° C., whereby damage to the fibers is prevented.

Alkaline lye and chlorine may be produced in the process according to the invention in two chambers separated by a diaphragm, the stock being first passed through the first chamber and then, but not necessarily directly thereafter, through the second chamber.

Of special advantage is a process, in which after passage of the stock through a cathode chamber by alkaline lye in statu nascendi, the greater part of the liquid is extracted therefrom, whereupon the stock is opened by mechanical means. Subsequently the concentrated and opened stock is passed to the anode chamber, where it is treated with chlorine in statu nascendi.

In order to increase the economics of the process, the liquid extracted from the stock, after it has passed through the first chamber, may be added at the beginning of the process, e. g., at the stage where the salt solution required for electrolysis is added to the stock.

Furthermore, it is advantageous to employ part of the extracted liquid, which contains alkaline lye among other compounds, for washing the stock after its treatment with chlorine.

A particularly advantageous process is attained when the alkaline lye is produced in a plurality of first chambers and the chlorine in a plurality of second chambers with the stock being alternately passed through a first and a second chamber.

Preferably the stock has a residual alkaline nature after being treated by alkaline lye and before being treated by chlorine.

In order to help obtain a final product of uniform character, agitating means may be employed which agitates the material during its passage through the apparatus.

In view of the higher reactive speed of the chlorine as compared with alkaline lye the stock may be passed through at least one second chamber faster, preferably twice as fast, as through at least one first chamber.

Preferably the stock is passed through the apparatus horizontally because the flow may be held more uniform then.

It is of advantage for the subsequent treatment according to the invention when air is at least partly extracted from the stock before it is processed.

The quality and properties of the final product may be varied to a wide extent by control of the various conditions of the process. The specific conditions which will result in the desired properties of the final product starting with any particular raw material may be easily determined by anyone skilled in the art by simple pretesting after knowledge of the basic inventive features of the present invention.

However, for a better understanding of the present invention and in order to further illustrate the invention for those skilled in the art, a further description of practical limits within which the process of the present invention should generally be carried out is herewith given.

The amount of current at the cathode side wherein the caustic soda is produced in statu nascendi for the treatment of the cellulose-containing material is generally at least 12,000 coulombs per kg. of dry cellulose-containing material and is generally not greater than 800,000 coulombs per kg. Preferably the amount of current varies between 48,000–540,000 coulombs per kg. of dry cellulose-containing material. Because of the fact that chlorine has a higher reactive speed than caustic soda and in fact actually reacts just about twice as fast as the caustic soda, the total amount of current at the anode side is preferably just about one-half of that on the cathode side, e. g. between 6,000–400,000 coulombs per kg. and preferably between 24,000–270,000 coulombs per kg.

Similarly, the total working time in the anode compartment is about one-half of that of the cathode compartment. For example, the working time in the cathode compartment generally varies between 20 and 360 minutes while in the anode compartment the working time generally varies between 10 and 180 minutes. As this indicates, the working time in the anode compartment is exactly one-half of the working time in the cathode compartment. This ratio can of course be varied, though the total treatment time in the anode compartment is always less than the total treatment time in the cathode compartment.

The amperage for the process is generally maintained between 3 and 50 amperes/kg. material and most preferably between 10 and 30 amperes. The voltage is generally maintained between 3.5 and 15 volts.

The current density may also be varied and is generally maintained at the anode side between 5 and 20 amperes per square decimeter and at the cathode side between 10 and 100 amperes per square decimeter.

The distance between the two electrodes may also be varied depending upon other conditions of the process but for practical purposes is generally maintained between 5 and 100 mm.

An additional factor which should be considered by those carrying out this process is the variation possibilities by controlling the number of revolutions per unit time period and the position of the arms of the stirring device which is used to stir the finely divided cellulose-containing material in the liquid. Depending upon the treated material, the variation in the number of revolutions and the position of the arms of the stirring device can control the passing of the cellulose-containing material across the electrodes so that the passage of the material is more or less intensive and thereby also control the properties and characteristics of the final product.

The electrolyte content of the solution may be varied within extremely wide limits, the exact concentration of electrolyte in the solution being mainly a matter of economy. Generally the concentration of the electrolyte e. g. NaCl, will vary between 2-15% by weight of the solution. If the electrolyte concentration is too small, the operating voltage is increased as is thereby the product of the amperage and the voltage, namely the wattage. If the electrolyte concentration is too high, the loss of electrolyte is correspondingly higher. Therefore the exact control is determined by the operator under particular plant conditions.

The proportion of electrolyte solution to cellulose-containing material (fibrous plant material), is for practical purposes varied between a ratio of 5:1 and a ratio of 30:1. The concentration of the cellulose-containing material is dependent upon the type of material and upon other factors such as the degree of subdivision thereof, etc. In general, at the beginning of the process there is a lower concentration of cellulose-containing material distributed in the solution than is necessary during later stages of the process.

It has also been found that the best results are obtained according to the process of the present invention when the ratio between the electrolyte dissolved in the solution and the cellulose-containing material distributed in the solution is between 3:1 and 1:3. Most preferably the ratio of the electrolyte in solution to the cellulose-containing material in the charge is 1:1, for example excellent results have been obtained with solutions containing 5-10% electrolyte in solution, and the amount of fibrous plant material distributed therein being 10%.

The temperature in the cathode chamber during the process is preferably maintained between 40° C. and the boiling temperature of the aqueous liquid. In the anode chamber the temperature is preferably maintained between 20° C. and about 60° C.

The pH of the solution in the cathode compartment of the electrolyzer is always above pH 8 and in the anode compartment the pH may be controlled by the addition of varying amounts of suitable buffer substances, and if necessary, hydrochloric acid. In general the pH value in the anode compartment is preferably maintained between 4 and 6.5.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing is a diagrammatic elevational view of an apparatus for carrying out the process according to the present invention.

Referring now more particularly to the drawings, the raw material or stock is continuously fed through a feed-pipe 10 to a mixer 12 which is also continuously supplied with a suitable salt solution, e. g., a sodium chloride solution, through pipe 36 from a supply container 11. Additional liquid is fed to the mixer 12 through a pipe 30. The type of this liquid and its generation will be discussed later on.

In the mixer 12 the various components are thoroughly mixed to a material of semifluid consistency which is passed on through conduit 13 to a container 14 consisting of two reaction chambers 141 and 142 separated by a diaphragm. The container is mounted on insulators 37. The chamber 142 is coated on the inside with a chlorine-resisting coating 40. In order to protect the diaphragm 15 from corrosion, two protecting sheets 16 are arranged on both sides of the diaphragm 15.

Incorporated in the chamber 141 is a cathode 17 and in the chamber 142 an anode 18, both supplied with electric energy from a D. C. source not illustrated in the drawing. The current and thus the electrolysis is controlled through a regulator 34 of conventional construction.

From the top portion of chamber 141 a pipe 19 leads to an extracting unit 20 connected through pipe 21 with an opening unit 22, wherein the fibers of the stock are suitably opened by mechanical means.

The unit 22 is connected with chamber 142 by a return conduit 23. The required salt solution is continuously supplied to chamber 142 from a supply tank 32 through pipe 33. Near the bottom of chamber 142 an outlet pipe 24 is arranged, which connects chamber 142 with an extractor 25 equipped on its bottom with an outlet conduit 26. A main pipe line 27 connects the extractor 25 with a multi-stage washer 28 from which the stock is supplied through conduit 39 to further installations, where it is subjected to final treatment in the same manner as is done in conventional types of plants.

Conduit 31 connects the first stage of washer 28 with conduit 30. The effluent of this first washer stage flows out through conduit 29. The additional washer stages—only one is indicated in the drawing—are supplied with water through a pipe 35 with the water leaving the stage through a pipe 38.

The operation of the apparatus shown in the drawing will now be explained in detail:

In the mixer 12 the stock is mixed with a common salt solution and return liquid from the extracting unit 20. Through the main line 13 the stock is supplied to the reaction chamber 141, where caustic soda is continuously produced, the caustic soda reacting with the stock in statu nascendi. The stock acted upon by the caustic soda is passed on from the chamber 141 through conduit 19 to the extracting unit 20, where the greater part of the liquid is extracted. This liquid is in part supplied to the mixer 12 through conduit 30 and in part to the first stage of the washer 28 through conduit 31 branching off from conduit 30.

From the extracting unit 20 the stock enters through conduit 21 an opening unit 22, wherein the vegetable fibers are mechanically opened up as far as is possible at this stage of the process.

From the opening unit 22 the stock travels to the reaction chamber 142 of container 14, where the chlorine produced by the electrolysis acts in statu nascendi upon the penetrated stock. The common salt solution in this chamber is continuously supplemented from a supply container 32 through conduit 33. Through the outlet pipe 24 the digested stock is passed onto the extractor 25, where the major part of the liquid is extracted. This latter liquid contains among other compounds active chlorine, which may be employed for producing a suitable bleaching lye. The stock then travels to a multi-stage washer 28, only two stages being, however, indicated in the drawing. In the first stage the stock is treated with extracted liquid coming from the extracting unit 20 through conduit 31, mainly for the purpose of reacting with the chlorine lignin produced through the chlorine process. The treating liquid leaves the first washer stage through conduit 29 and is then passed on to evaporating, drying, and burning installations with the result that the energy and the chemical compounds contained therein may be reutilized for the continuous digestion process, e. g., in the form of heat, steam, or electric energy. In the remaining stages of the washer the stock is subsequently treated in a conventional manner.

The following examples are given to further illustrate the process of the present invention, the scope of the invention not however being limited to the specific details of the examples.

*Example 1*

A fibrous plant material such as straw, bagasse, bamboo, or the like is first in a so-called straw chopping machine or in a similar apparatus subdivided into a size such that no piece is greater than 40 mm. long and thicker than about 2–3 mm. The subdivided raw material is then for most purposes freed of dust particles and undesired impurities. Subsequently the thus pretreated material is freed of enveloped air contained between particles of the material by treatment with high pressure steam so that upon mixing the material with a liquid the material does not float on the surface of the liquid. For this purpose the material is continuously passed through a steam vessel. The treatment time herein varies between 10 minutes and 1 hour.

After leaving the steam container, the material is conveyed to the cathode chamber of an apparatus of the type herein described. The material is mixed with an aqueous solution containing 10% sodium chloride and small amounts of other salts such as $CaSO_3$ and the like which have a desired chemical effect on the final condition of the product. The amount of dry cellulose material to the amount of solution at this point in the process is in a ratio of 1:20. The electrolyte solution with the finely divided cellulose material distributed therethrough is in the cathode chamber subjected for about 60 minutes to a current of 10 amperes per kg. of dry material. The material in the cathode chamber is stirred and simultaneously moved forward. The temperature in the cathode chamber is maintained between 80 and 100° C., if necessary by means of outside cooling or heating means.

After the treatment in the cathode chamber, the thus treated substance along with the liquid and the chemical compounds from the cathode chamber is continuously removed from the chamber and conducted to a further container for the opening up of the cellulose material. The material is opened up by a beater or other similar device which has the effect of loosening the connection between the individual fiber portions. This treatment is carried out while the fibrous portions are still in the liquid from the cathode chamber. During this beating or the like for opening up of the fiber particles, a further chemical action of the chemicals removed from the cathode chamber on the fiber portions occurs. The treatment temperature is maintained at about 80–100° C., that is within a temperature range below the boiling point of the solution, while in the later treatments in the anode chamber, the temperature is maintained at not higher than 60° C., in order to prevent a harmful influence of the chlorine on the cellulose fibers.

The thus treated material is then separated from the liquid by means of a screw press. The particles thus form a rather wet mass. This mass is then mechanically loosened and subsequently mixed with the desired liquid, namely a 10% solution of sodium chloride with additional substances such as $CaSO_3$. The ratio of dry fibrous material to liquid may herein be lowered to about 1:15. The mixture is thoroughly mixed and as a suspension is continuously conducted to the anode chamber. In the anode chamber it is treated for 30 minutes with a current of 10 amperes per kg. of dry mass. By means of stirring, the suspension is continuously passed across the electrodes and through the electrode chamber. Subsequently after removal from the anode chamber the fiber material is separated from the liquid by means of a screw press or the like. The then remaining wet mass is washed once with fresh water at a temperature of about 50° C.

After the washing, the fibrous material is again separated from the liquid by means of a screw press or a similar apparatus. The thus treated material is then again mixed with an electrolyte solution as described above, the ratio of dry fibrous material to electrolyte solution being about 1:10, and the thus formed mixture is continuously conducted to a second cathode chamber in which the material is treated in a similar manner to that described above. In this second cathode chamber the material is treated for 30 minutes with a current of 10 amperes per kg. of dry fibrous material.

The material coming from the cathode chamber is then conducted to a screw press wherein the material is continuously separated from the liquid. This material is then mixed with fresh electrolyte solution in a ratio of 1 part dry material to 8 parts of solution, continuously conducted to a second anode chamber and therein treated for about 20 minutes with a current of about 10 amperes per kg. of dry mass, similarly to the anode treatment described above. The material coming from the anode chamber is again separated from the liquid by means of a screw press or similar apparatus.

The separated electrolyte solution, separated from the mass coming from the anode solution and also that separated from the mass coming from the cathode solution can be again used for the treatment of other fibrous materials.

The alternate cathode and anode treatments may be continued as much as desired depending upon the desired characteristics of the final product. Also, the treatment time in each of the cathode and anode chambers may be lowered as the decomposition degree of the material is improved and the ratio of solid particles (of fibrous material) to the liquid can continuously be increased as the process continues. Generally the ratio of solid particles to liquid should not be greater than 1:5.

The material from the anode chamber after separation of the liquid therefrom is subsequently treated with the spent liquor from the cathode chamber. This has the effect of dissolving the chlorolignin formed in the anode chamber so that the cellulose fibers are more or less after this treatment set free. After the treatment with the spent liquor from the cathode chamber, the material is continuously separated from liquid by means of a screw press or the like. The thus obtained material is then again washed with hot water, again separated from the liquid, again washed with hot water and finally again separated from the liquid. This washing liquid is preferably utilized to form a new electrolyte solution for the cathode treatment.

The resulting product obtained by this example is a rather fine hemicellulose. As will be shown in further examples, the control of the treatment time, the number of alternate cathode and anode treatments, the current, etc. can result in control of the properties and characteristics of the final product. The cellulose obtained by this example is suitable for the making of fine paperboard and packing paper or the like.

*Example 2*

This example is carried out as Example 1, utilizing however a 15% solution of sodium chloride and a ratio of dry fiber material to electrolyte solution of 1:30, in the cathode chamber. The fiber material is first prewetted by treatment for about 60–100 minutes with an NaOH-containing aqueous solution at a temperature of about 80–90° C. The fiber material is then suspended in the electrolyte solution and subjected in the cathode chamber to a current of 10 amperes per kg. of dry fiber material for about 20 minutes.

After the cathode treatment, the fiber material in the solution from the cathode chamber is opened by beating or the like, separated from the liquid by means of a screw press, mixed with an electrolyte solution and treated in the anode chamber for 10 minutes with a current of 10 amperes per kg. of fiber material.

The product obtained from this single cathode chamber treatment and single anode chamber treatment is a coarse hemicellulose which is suitable for the manufacture of paperboard and coarse packing paper.

*Example 3*

This example is carried out as Example 1 utilizing however an 8% potassium chloride solution as the electrolyte solution and utilizing a ratio of dry fiber material to electrolyte solution of 1:25.

The material is subjected to a first cathode chamber treatment for 60 minutes utilizing a current of 10 amps. per kg. of dry fiber material. After the cathode chamber treatment the fiber material, while still contained in the cathode chamber liquid, is opened up by a beating device or the like, separated from the cathode chamber liquid by means of a screw press, mixed with electrolyte solution in a ratio of 1 part dry fiber material to 18 parts of liquid and conducted to the anode chamber wherein it is treated for 40 minutes utilizing a current of 10 amperes per kg. of fiber material.

The mass coming from the anode chamber is subsequently treated for 20 minutes utilizing a current of 20 amps. per kg. of fiber material in a cathode chamber for the purpose of neutralization, after which the fiber material is separated from the liquid, washed with water, again separated from the liquid, again washed with water and finally again separated from the liquid. The resulting product is a medium hemicellulose which is suitable for the making of paperboard and coarse packing paper.

Example 4

This example is carried out according to Example 1 utilizing an 8% NaCl solution and a ratio of 1 part dry fiber material to 30 parts of liquid to start.

The material is subjected in a first cathode chamber to a current of 15 amps. for 30 minutes after which the fibrous material is opened up by beating or the like while still contained in the liquid from the cathode chamber. The fibrous material is then separated from the liquid, mixed with electrolyte solution in a ratio of 1 part fiber material to 20 parts of liquid and treated in a first anode chamber for 15 minutes with a current of 15 amps. per kg. of fiber material.

The fiber material is then separated from the liquid, mixed with electrolyte solution in the ratio of 1 part of fiber material to 15 parts of electrolyte solution and treated in a second cathode chamber for 30 minutes utilizing a current of 15 amps. per kg. of fiber material. The fiber material is then separated from the solution, mixed with electrolyte solution in a ratio of 1:12 and treated in a second anode chamber for 15 minutes utilizing a current of 15 amps. per kg. of fiber material. The fiber material is subsequently separated from the liquid, neutralized with the spent liquor from the cathode chamber, separated from the neutralization liquor and washed with water 3 times with intermediate separations of the fiber material from the wash water. The resulting product is a normal bleachable paper cellulose which is suitable for the manufacture of ordinary writing paper and the like.

Example 5

In this example a 10% salt solution consisting of 5% NaCl and 5% KCl is used as electrolyzing agent and the starting concentration of fiber material to solution is 1:30.

The material is first treated in a cathode chamber for 60 minutes with current of 10 amps. per kg. of fiber material. The fiber material is then opened up by beating while still in the liquid from the cathode chamber after which it is separated from the liquid, mixed with electrolyte solution in a ratio of fiber material to solution of 1:25 and conducted to an anode chamber. In the anode chamber the material is treated for 15 minutes with a current of 10 amps. per kg. of fiber material after which the fiber material is separated from the liquid, mixed with electrolyte solution in a ratio of 1 part fiber material to 20 parts of solution and treated in an anode chamber for 30 minutes utilizing a current of 7.5 amps. per kg. of fiber material.

The fiber material is then separated from the liquid, mixed with electrolyte solution in a ratio of 1 part dry material to 15 parts of solution, treated in an anode chamber for 15 minutes utilizing a current of 7.5 amps. per kg. of dry material, separated from the solution and washed with water. The washed material is then separated from the washing liquid, mixed with the electrolyte solution in the ratio of 1 part dry material to 12 parts of solution and treated again in a cathode chamber, for 15 minutes utilizing a current of 5 amps. per kg. of fiber material. The fiber material is subsequently separated from the liquid, mixed with electrolyte solution in a ratio of 1 part dry material to 10 parts of solution and subjected to anode chamber treatment for 10 minutes with a current of 5 amps. per kg. of fiber material.

The material is then separated from the liquid, washed with water, neutralized with spent liquor from the cathode chamber, separated from the neutralizing liquor and washed three times with alternate separations from the washing liquid. The resulting product is a normal bleachable paper cellulose which is suitable for the manufacture of ordinary writing paper and the like.

Example 6

In this example a 5% NaCl solution is utilized as the electrolyte solution. The ratio of dry fiber material to liquid in the first cathode treatment is 1:20.

The sequence of the operation is as follows: treatment for 30 minutes in a cathode chamber with a current of 20 amps. per kg. of fiber material, opening of the fiber material by beating in the liquid from the cathode chamber, separation from the liquid, mixing with electrolyte solution in a ratio of 1:18, anode chamber treatment for 10 minutes with a current of 20 amps. per kg. of fiber material, separation from liquid, washing, separation, mixing with electrolyte solution in the ratio of 1:15, cathode chamber treatment for 15 minutes with a current of 10 amps. per kg. of fiber material, separation from liquid, mixing with electrolyte solution in a ratio of 1:12, anode treatment for 10 minutes utilizing 10 amps. per kg. of fiber material, separation, washing, separation, mixing with electrolyte solution in a ratio of 1:12, cathode chamber treatment for 15 minutes utilizing a current of 5 amps. per kg. of fiber material, separation, mixing with electrolyte solution in a ratio of 1:10, anode chamber treatment for 10 minutes at 5 amps. per kg. of fiber material, separation, washing, separation, mixing with electrolyte solution in a ratio of 1:10, cathode chamber treatment for 15 minutes at 2 amps. per kg. of fiber material, separation, mixing with electrolyte solution in a ratio of 1:8, anode chamber treatment for 10 minutes at 2 amps. per kg. of fiber material, separation, washing, neutralization with spent liquor from the cathode chamber, separation, and 3 washings with alternate separations.

The resulting product is a very soft and very light bleachable paper cellulose which is highly suitable as admixture for the manufacture of very valuable writing paper.

Example 7

In this example a 5% KCl solution is used as the electrolyte solution. The starting ratio of fiber material to liquid is 1:30 and is gradually lowered as the process progresses until in the final electrolytic treatment the ratio is 1:5.

The sequence of operation is indicated in the following columns, reading the columns from left to right, and in which the following abbreviations apply:

$O$ = opening of fiber material by beating or the like
$S$ = separation of the fiber material from the liquid
$W$ = washing of the fiber material with water with subsequent separation of the fiber material from the wash water, for example WW meaning two washings with alternate separations from the wash water
$M$ = mixing the fiber material with electrolyte solution

| Cathode Treatment | | Intermediate | Anode Treatment | | |
|---|---|---|---|---|---|
| duration | amps. per kg. of fiber material | | duration | amps. per kg. of fiber material | |
| 30 | 40 | O-S-M | 20 | 40 | S-M |
| 30 | 10 | O-S-M | 30 | 10 | S-W-M |
| 15 | 7.5 | S-M | 15 | 7.5 | S-M |
| 10 | 10 | | | | |
| as cathodic neutralization. | | S-WWW | | | |

The resulting product is a very soft very easily bleachable paper cellulose which is suitable as admixture for the manufacture of highly valuable writing paper.

*Example 8*

In this example a 7% NaCl solution is used as the electrolyte solution. The starting ratio of fiber material to liquid is 1:30 and is gradually lowered as the process progresses until in the final electrolytic treatment the ratio is 1:5.

The sequence of operation is indicated in the following columns, reading from left to right and in which the same abbreviations apply as above.

| Cathode Treatment | | Intermediate | Anode Treatment | | |
|---|---|---|---|---|---|
| duration | amps. per kg. of fiber material | | duration | amps. per kg. of fiber material | |
| 30 | 50 | O-S-M | 10 | 50 | S-W-M |
| 20 | 50 | O-S-M | 10 | 50 | S-W-M |
| 20 | 50 | O-S-W-M | 10 | 50 | S-W-M |
| 15 | 50 | S-M | 10 | 50 | S-WW-M |
| 45 | 30 | S-W-M | 20 | 30 | S-WW-M |
| 20 | 20 | | | | |
| as cathodic neutralization, or neutralization with spent liquor from the cathode chamber. | | S-WWWW | | | |

The resulting product is a cellulose of the highest purity, e. g. highly pure alpha cellulose which is suitable for such purposes as in the artificial fiber industry.

It will be understood that each of the elements described above, or two or more together, may also find a useful application in other types of digesting processes differing from the types described above.

While the invention has been illustrated and described as embodied in the electrolytic digestion of cellulose-containing material such as wood, straw and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of digesting cellulosic material, comprising the steps of subjecting a salt solution adapted upon electrolysis to form alkaline lye molecules at the cathode and having a fibrous cellulose-containing material distributed therethrough to electrolysis in an electrolyzer having a cathode compartment whereby said cellulose-containing material in said cathode compartment is subjected to treatment by the formed alkaline lye molecules in statu nascendi thereof; washing the thus treated fibrous cellulose-containing material; mechanically opening the thus treated fibrous cellulose-containing material; and subjecting a salt solution adapted upon electrolysis to form chlorine molecules at the anode and having said thus treated and opened fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof.

2. A process of digesting cellulosic material, comprising the steps of subjecting a salt solution adapted upon electrolysis to form alkaline lye molecules at the cathode and having a fibrous cellulose-containing material distributed therethrough to electrolysis in an electrolyzer having a cathode compartment whereby said cellulose-containing material in said cathode compartment is subjected to treatment by the formed alkaline lye molecules in statu nascendi thereof; removing the liquid and the thus treated cellulose-containing material contained therein from said cathode compartment; mechanically opening the thus treated fibrous cellulose-containing material while still contained in said liquid from said cathode compartment; separating said opened, treated fibrous cellulose-containing material from the greater part of said liquid; mixing the thus separated fibrous cellulose-containing material with a salt solution adapted upon electrolysis to form chlorine molecules at the anode; and subjecting said salt solution having said fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof.

3. A process of digesting cellulosic material, comprising the steps of subjecting a salt solution adapted upon electrolysis to form alkaline lye molecules at the cathode and having a fibrous cellulose-containing material distributed therethrough to electrolysis in an electrolyzer having a cathode compartment whereby said cellulose-containing material in said cathode compartment is subjected to treatment by the formed alkaline lye molecules in statu nascendi thereof; washing the thus treated fibrous cellulose-containing material; subjecting a salt solution adapted upon electrolysis to form chlorine molecules at the anode and having the thus treated fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof; and repeating said alternate alkaline lye and chlorine treatments of said cellulose-containing material as many times as desired.

4. A process of digesting cellulosic material, comprising the steps of subjecting a salt solution adapted upon electrolysis to form alkaline lye molecules at the cathode and having a fibrous cellulose-containing material distributed therethrough to electrolysis in an electrolyzer having a cathode compartment whereby said cellulose-containing material in said cathode compartment is subjected to treatment by the formed alkaline lye molecules in statu nascendi thereof; removing the liquid and the thus treated cellulose-containing material contained therein from said cathode compartment; mechanically opening the thus treated fibrous cellulose-containing material while still contained in said liquid from said cathode compartment; separating said opened, treated fibrous cellulose-containing material from the greater part of said liquid; mixing the thus separated fibrous cellulose-containing material with a salt solution adapted upon electrolysis to form chlorine molecules at the anode; subjecting said salt solution having said fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof; and utilizing said liquid separated from said treated fibrous cellulose-containing material as at least a portion of the salt solution for the treatment of fibrous cellulose-containing material with alkaline lye molecules in statu nascendi thereof.

5. A process of digesting cellulosic material, comprising the steps of subjecting a salt solution adapted upon electrolysis to form alkaline lye molecules at the cathode and having a fibrous cellulose-containing material distributed therethrough to electrolysis in an electrolyzer having a cathode compartment whereby said cellulose-containing material in said cathode compartment is subjected to treatment by the formed alkaline lye molecules in statu nascendi thereof; removing the liquid and the thus treated cellulose-containing material contained therein from said cathode compartment; mechanically opening the thus treated fibrous cellulose-containing material while still contained in said liquid from said cathode compartment; separating said opened, treated fibrous cellulose-containing material from the greater part of said liquid; mixing the thus separated fibrous cellulose-containing material with a salt solution adapted upon electrolysis to form chlorine molecules at the anode; subjecting said salt solution having said fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof; and treating the thus chlorine-treated cellulose-containing material with said liquid separated from said cellulose-containing material after said alkaline lye treatment thereof.

6. A process of digesting cellulosic material, comprising the steps of subjecting a salt solution adapted upon electrolysis to form alkaline lye molecules at the cathode and having a fibrous cellulose-containing material distributed therethrough to electrolysis for a predetermined time in an electrolyzer having a cathode compartment whereby said cellulose-containing material in said cathode compartment is subjected to treatment by the formed alkaline lye molecules in statu nascendi thereof; mechanically opening the thus treated fibrous cellulose-containing material; and subjecting for a time period which is approximately one-half of said predetermined time during which said cellulose-containing material was treated in said cathode compartment a salt solution adapted upon electrolysis to form chlorine molecules at the anode and having said thus treated and opened fibrous cellulose-containing material distributed therethrough to electrolysis in an electrolyzer having an anode compartment until said cellulose-containing material is digested a predetermined degree whereby said cellulose-containing material in said anode compartment is subjected to treatment by the formed chlorine molecules in statu nascendi thereof.

7. A process according to claim 3 in which the total amount of current applied during said cathode compartment treatment is between 12,000 and 800,000 coulombs per kg. of dry cellulose-containing material and the total amount of current applied during said anode compartment reatment is between 6,000–400,000 coulombs per kg. of dry cellulose-containing material.

References Cited in the file of this patent

UNITED STATES PATENTS

| 560,411 | Kellner | May 19, 1896 |
| 588,085 | Pond | Aug. 10, 1897 |
| 1,800,870 | Milne | Apr. 14, 1931 |